United States Patent [19]
Castle et al.

[11] Patent Number: 5,493,488
[45] Date of Patent: Feb. 20, 1996

[54] ELECTRO-PNEUMATIC CONTROL SYSTEM AND PID CONTROL CIRCUIT

[75] Inventors: Jonathan Castle, Los Angeles; Albert L. Badgen, Northridge, both of Calif.

[73] Assignee: Moore Industries International, Inc., Sepulveda, Calif.

[21] Appl. No.: 350,263

[22] Filed: Dec. 5, 1994

[51] Int. Cl.⁶ ................................................. G05B 11/42
[52] U.S. Cl. ............................................. 364/162; 137/85
[58] Field of Search ................................ 137/85; 364/162

[56] References Cited

U.S. PATENT DOCUMENTS

| | | |
|---|---|---|
| 2,638,911 | 5/1953 | Griswold et al. . |
| 2,842,147 | 7/1958 | Markson . |
| 2,914,076 | 11/1959 | Zimmerli . |
| 2,928,409 | 3/1960 | Johnson et al. . |
| 2,939,430 | 6/1960 | Westbury . |
| 2,941,723 | 6/1960 | Stevens . |
| 2,985,183 | 5/1961 | Peatross . |
| 2,993,497 | 7/1961 | Coles et al. . |
| 3,063,422 | 11/1962 | Gregowski et al. . |
| 3,113,583 | 12/1963 | Hudson . |
| 3,134,425 | 5/1964 | Oppenheimer et al. . |
| 3,387,619 | 6/1968 | Berger, Jr. et al. . |
| 3,390,694 | 7/1968 | Rouvalis . |
| 3,410,519 | 11/1968 | Evans . |
| 3,456,669 | 7/1969 | Lloyd . |
| 3,586,287 | 6/1971 | Knobel . |
| 3,645,293 | 2/1972 | Pedersen . |
| 3,786,363 | 1/1974 | Lelie . |
| 3,817,488 | 6/1974 | Mack . |
| 3,982,554 | 9/1976 | Saito et al. . |
| 4,275,453 | 6/1981 | Wagner . |
| 4,303,889 | 12/1981 | Yokoyama et al. . |
| 4,481,967 | 11/1984 | Frick . |
| 4,579,137 | 4/1986 | Brandt, Jr. . |

OTHER PUBLICATIONS

Article–F.E.J, Girling and E. F. Good, Active Filters, Wireless World, Dec. 1969, pp. 568–572.
Realisation of Transfer Functions Using One Amplifier, Electronics Letters, Sep. 18, 1969, vol. 5 No. 19, pp. 458–460.

Primary Examiner—Gerald A. Michalsky
Attorney, Agent, or Firm—Knobbe, Martens, Olson & Bear

[57] ABSTRACT

An electro-pneumatic control system and single op-amp PID control circuit is provided for regulating the output pressure response provided to a load. The control system includes a control valve for producing a control pressure signal and a booster for providing an output pressure response to a pneumatic load in accordance with the control pressure signal. A pressure sensor is further provided for measuring the output pressure response provided to the load and for generating a corresponding feedback voltage signal provided to the control circuit. The control circuit compares the feedback signal to a command signal input in accordance with a predetermined transfer function having proportional, integral and derivative (PID) components, and generates a control voltage signal for stably controlling the output pressure response provided to the load.

15 Claims, 8 Drawing Sheets

ELECTRO-PNEUMATIC CONTROL SYSTEM AND PID CONTROL CIRCUIT

BACKGROUND OF THE INVENTION

1. Field of the Invention

This invention relates to pneumatic controls. In particular, the invention relates to an improved electro-pneumatic control system and electronic control circuit having proportional, integral and derivative ("PID") feedback characteristics adapted to provide fast and accurate pressure regulation of a pneumatic load.

2. Description of the Related Art

In many industrial applications it is often desirable to be able to control a relatively large volume of air at a predetermined pressure and flow rate using a relatively small pneumatic or electrical control signal. Typical industrial controls for this purpose are open-loop mechanical controls, being comprised of various combinations of springs, valves, diaphragms and flow orifices. Typically, a pneumatic control signal input is provided at one end of a pneumatic regulator and operates against a spring-loaded control valve or similar device to achieve a corresponding desired pressure and/or flow output response at the output end according to well-known principles of fluid dynamics. This output pressure may be used to operate a pneumatic load, such as a hydraulic valve, piston actuator, or pneumatic motor.

Electrical or electro-pneumatic controls are also known for pneumatic pressure regulation. Typical electro-pneumatic controls are also open-loop controls adapted to provide an output pressure or flow response in accordance with an electrical control signal input. Typically, a small electrical current signal is provided to the main winding of a spring loaded solenoid, which, in turn, operates a pneumatic valve. Depending upon the magnitude of the current signal provided to the main winding of the solenoid, the displacement of the valve may be varied to determine the approximate flow rate and pressure output response provided to a pneumatic load.

A significant drawback of open-loop control systems is that the output response often varies considerably with the supply pressure and the back-pressure exerted by the load. Among other things, this can cause undesirable fluctuations in the speed and power output of air driven machinery or other pneumatically operable equipment. For static loads, such as a pneumatically operable valve, such pressure variations can cause the valve setting to drift or fluctuate from one valve setting to another, allowing too much or too little fluid to flow through the valve. This effect can be problematic in some service applications.

Providing a pneumatic control regulator having closed-loop pneumatic or electrical feedback can alleviate some of these problems. Feedback control tends to compensate for variations in load and supply pressures such that a range of selectable output pressures and/or flow rates may be provided. Most such feedback control regulators, however, have poor dynamic response, and are unable to adjust quickly to supply and load back-pressure variations. This slow response time makes such prior art feedback control regulators unsuitable for many critical service applications, such as for controlling a cooling valve in a nuclear power plant. Such applications require not only a high degree of steady-state accuracy, but also a fast response time in order to quickly respond to rapidly changing conditions.

Another significant drawback of prior art feedback control regulators is that they tend to be load dependent. Depending upon the particular size and response characteristics of the load being controlled, most prior art feedback control regulators must be adjusted or "tuned" in order to achieve acceptable dynamic response and steady-state performance. Tuning is typically accomplished by adjusting the gain of the various feedback paths of the control system. The need to adjust or tune a control circuit to a particular load, however, is undesirable in applications having changing load requirements or in critical service applications requiring a high degree of precision and stability for any given load condition.

Previous attempts to overcome the aforementioned problems have involved sophisticated control circuitry having "anti-windup" features and other high-level circuitry in order to attempt to accommodate changes in the size and response characteristics of the particular load being controlled. While some of these control circuits have been able to achieve acceptable results from a performance standpoint, the sheer complexity of the circuitry reduces the overall reliability of the system as well as increases the cost of such control systems.

SUMMARY OF THE INVENTION

A simple and inexpensive electro-pneumatic feedback control system having improved dynamic response to obtain fast and accurate pressure regulation would represent a significant advance in the art. An electro-pneumatic control system that may be used to control a wide variety of pneumatic loads having different size and response characteristics would represent a further advance in the art. An electro-pneumatic feedback control system having inherent anti-windup features would represent an even further advance in the art.

Accordingly, in one embodiment the present invention provides a novel electro-pneumatic control system having closed-loop proportional, integral and derivative ("PID") feedback control characteristics for providing a desired pressure output response to a pneumatic load. The control system includes a control valve for producing a control pressure signal and a booster for providing an output pressure response to a load in accordance with the control pressure signal provided by the control valve. A pressure sensor is further provided for measuring the actual output pressure response provided to the load and generating a corresponding feedback voltage signal provided to the control circuit. The control circuit compares the feedback signal to a command signal input and generates a control voltage signal in accordance with a predetermined transfer function having proportional, integral and derivative feedback components for accurately controlling the output pressure response provided to the load.

In another embodiment, the present invention provides an electronic PID control circuit for providing fast and accurate closed-loop control of a load. The PID control circuit has multiple feedback loops which share a common node in the form of a current summation junction. A command input terminal is provided and is adapted to receive a command voltage signal $(-V_d)$ corresponding to a desired output pressure response. Coupled between the command input terminal and the current summation junction is a first electrical impedance adapted to deliver a first current that is substantially proportional to the command voltage signal.

A feedback input terminal is further provided and is adapted to receive a feedback voltage signal $(V_o)$ corresponding to the actual observed output response provided to the load. Coupled between the feedback input terminal and the current summation junction is a second electrical impedance adapted to deliver to a second current having at least one component thereof that is substantially proportional to the feedback voltage signal and at least another component thereof that is substantially proportional to the derivative of the feedback voltage signal. The net current into the summation junction (j) is equal to the difference between the magnitude of currents flowing through the first and second impedances and represents an error signal of the system. An integrator is further provided for integrating this error signal and for producing a corresponding control voltage signal ($V_c$) for accurately controlling the pressure response provided to the load.

In another embodiment the present invention comprises a novel control circuit having proportional, integral and derivative (PID) feedback for providing closed-loop control of a load. The control circuit provides a control voltage signal output ($V_c$) in response to a command signal input ($-V_d$) and a feedback signal ($V_o$), which is representative of the actual observed output response. The control circuit has a predetermined transfer function having the form:

$$V_c/V_o = -\left[\left(\frac{R_1}{R_2} + \frac{C_2}{C_1}\right) + \left(\frac{1}{R_2C_1}\right)\frac{1}{S} + (R_1C_2)S\right]$$

where $R_1$, $R_2$, $R_3$, $C_1$ and $C_2$ represent component values of individual electrical elements comprising the PID control circuit.

In another embodiment the present invention provides a single op-amp PID control circuit having inherent integrator anti-windup compensation. The control circuit comprises a single inverting op-amp having an input terminal and an output terminal. Multiple feedback paths are provided for allowing proportional, integral and derivative feedback control of a load. At least two of the feedback paths share a common node. The resulting interdependence of the feedback paths provides a control system with inherent integrator anti-windup compensation, allowing surprisingly stable response characteristics.

In another embodiment, the present invention comprises an electrically operable pneumatic control valve for controlling the flow of pneumatic fluid to a load. The control valve comprises a magnetic core having an electrical winding disposed therein. The core has at least one substantially flat surface for receiving a flapper member formed of a magnetic material. The flapper member also has at least one substantially flat surface for engaging the corresponding flat surface of the core. The flapper member is mounted adjacent the core such that it comes into contact with the discharge portion of a fluid conduit mounted in the core. The application of a voltage across the winding causes a current to flow therein inducing a magnetic field in the core. This causes the flapper member to be drawn toward the core fully or partially occluding the discharge portion of the conduit and producing a corresponding control back-pressure ($P_c$) therein.

In another embodiment, the present invention comprises a clean-out apparatus for allowing periodic removal of debris from an orifice mounted within a pneumatic device. The clean-out apparatus incudes a cylindrical housing configured to be fitted within an opening provided in a pneumatic device. A cavity is provided extending axially through the housing, defining at one end an opening for receiving an insertable orifice and at the other end an access hole. A spring-loaded plunger is slidably mounted within the cavity so that it may be resiliently displaced by an elongated actuator member acting through the access hole. A pin extends axially from the plunger and passes through the orifice when the plunger is fully actuated, thereby clearing the orifice of debris.

Other features and advantages of the present invention will become readily apparent to persons skilled in the art having reference to the drawings herein and the detailed description that follows.

DETAILED DESCRIPTION OF THE PREFERRED EMBODIMENTS

Figure 1A:
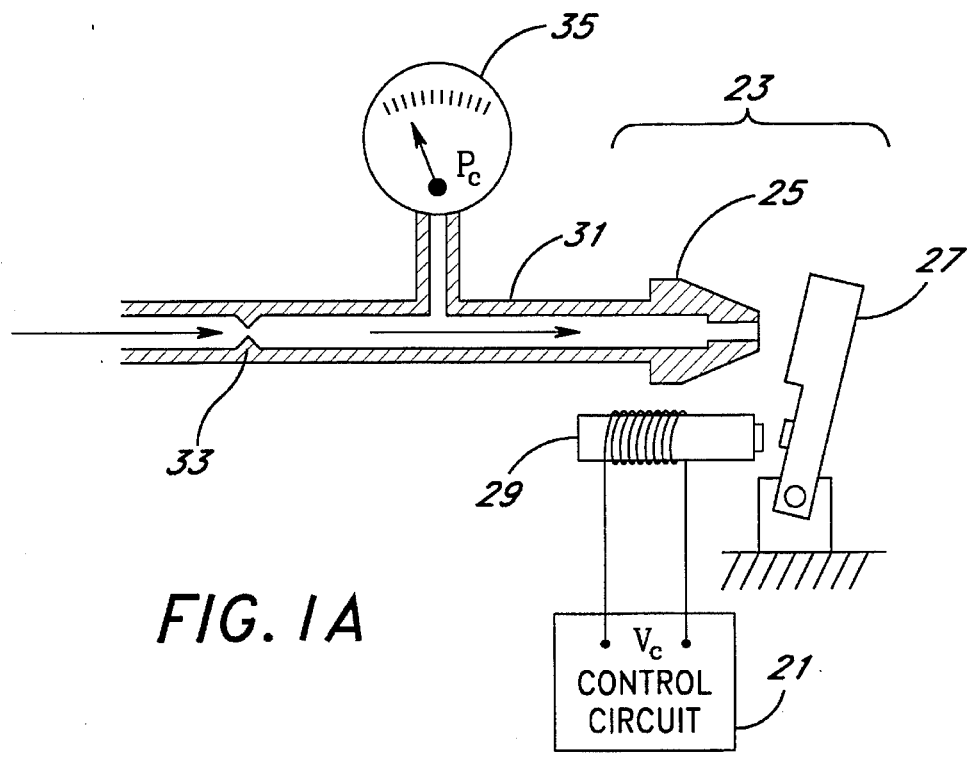
FIGS. 1A and 1B are schematic drawings illustrating the basic operation of an electro-pneumatic control system having features of the present invention.
Figure 1B:
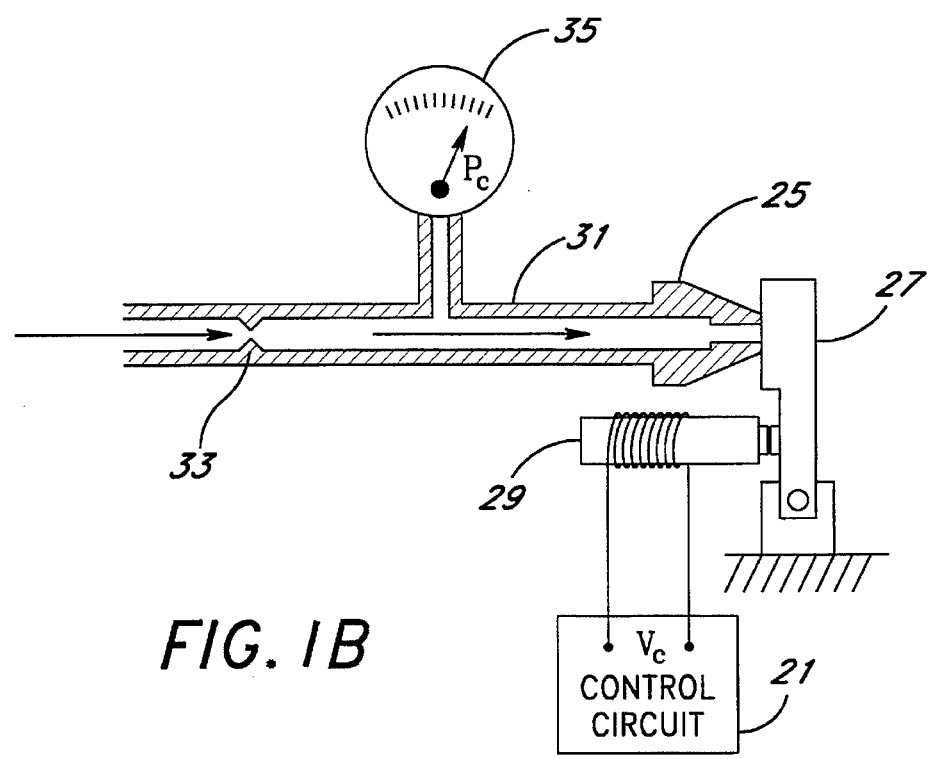

FIGS. 1A and 1B illustrate simplified schematic drawings of the basic operation of an electro-pneumatic control system having features of the present invention. The control system includes primarily a control circuit 21 adapted to drive an electrically operable control valve 23, as shown. The control valve 23 further comprises a nozzle 25, a pivot arm 27, and an electromagnetic induction coil 29, as shown. A pneumatic conduit 31 is provided for introducing fluid to an inlet end of the nozzle 25. A restriction orifice 33 is provided in the conduit 31, as shown, having a defined flow impedance characteristic. For a given pressure gradient across the restriction orifice 33 a predetermined amount of pneumatic fluid flow is allowed to pass and enter into the portion of the pneumatic conduit 31 between the restriction orifice 33 and the nozzle 25.

The pivot arm 27 is appropriately constructed such that it is drawn toward the discharge end of the nozzle 25 in response to a magnetic field induced by the application of a control voltage $V_c$ across the input and output terminals of the induction coil 29, as illustrated in FIG. 1B. When the control circuit 21 activates the induction coil 29, the pivot arm 27 is drawn toward the discharge end of the nozzle 25 with a defined force, corresponding to the strength of the magnetic field induced by the induction coil 29. This, in turn, may be selectively controlled by varying the output control voltage $V_c$ of the control circuit 21, as will be explained in more detail below.

In operation, a pneumatic fluid, such as air, is introduced into the pneumatic conduit 31, as shown, at an approximate predetermined "line" pressure. The fluid initially passes through the restriction orifice 33 disposed within the pneumatic conduit 31 and enters the inlet end of the nozzle 25, forming part of the control valve 23. With the pivot arm 27 in the disengaged position, as shown in FIG. 1A, the pressure drop across the unoccluded nozzle 25 is relatively small—sufficient to cause only a small control back-pressure $P_c$ in the conduit 31, as indicated schematically by the pressure display indicator 35. Increasing the control voltage output $V_c$ of the control circuit 21 increases the current through the induction coil 29 and the induced magnetic field therein. This draws the pivot arm 27 toward the nozzle 25 with a force sufficient to partially or fully occlude the discharge end of the nozzle 25, increasing the control back-pressure $P_c$ in the conduit 31 as indicated in FIG. 1B.

It will be appreciated that, depending upon the magnitude of the control voltage output $V_c$ of the control circuit 21, varying degrees of occlusion of the nozzle 25 can be attained as the force exerted by the pivot arm 27 upon the discharge end of the nozzle 25 is varied from relatively slight to relatively large. By selectively varying the control voltage output $V_c$ of the control circuit 21, the control back-pressure $P_c$ in the conduit 31 may be varied, as desired.

Figure 2:
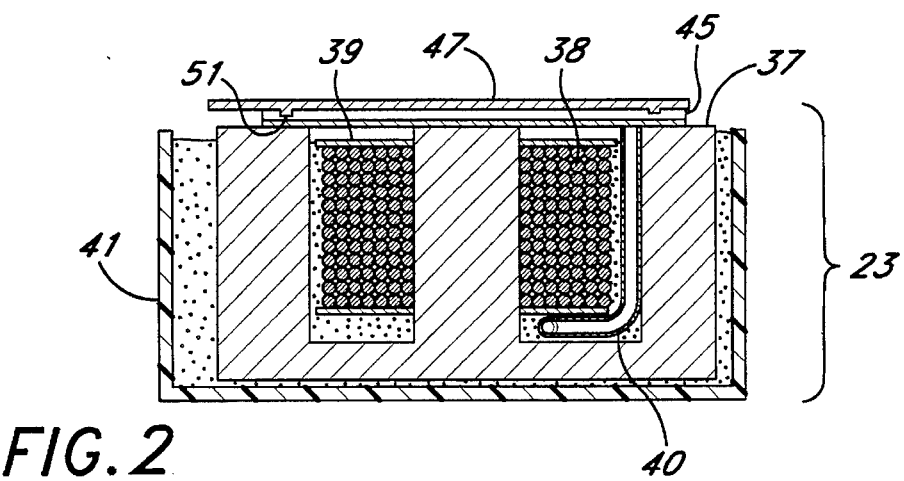
FIG. 2 is a cross-sectional view of a control valve having features of the present invention.
Figure 3:
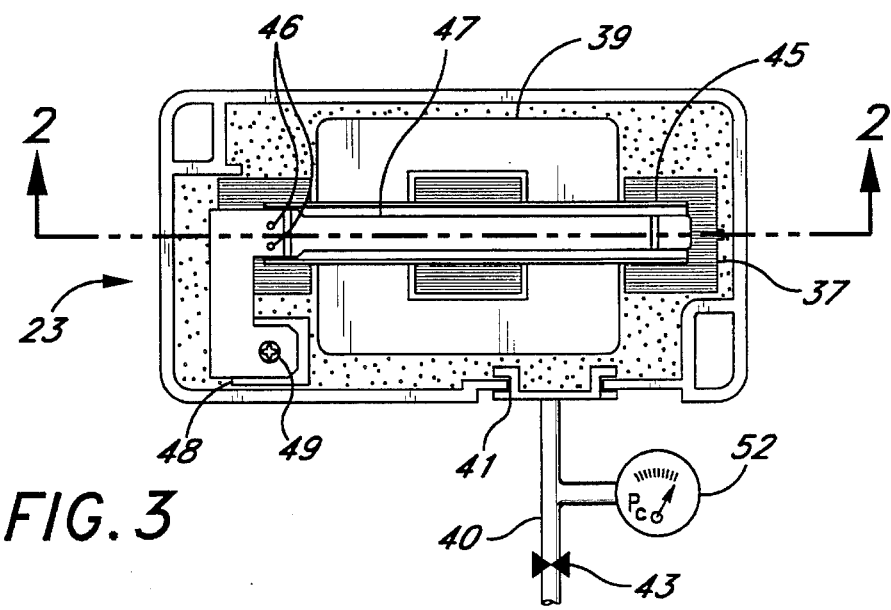
FIG. 3 is a top plan view of the control valve of FIG. 2.

FIGS. 2 and 3 illustrate a particularly preferred embodiment of a control valve 23 having features of the present invention. FIG. 2 is an elevational cross-sectional view of control valve 23. FIG. 3 is a top view of the control valve 23 of FIG. 2. Briefly, the control valve 23 comprises a magnetic E-core 37 having a winding 38 disposed therein, as shown. The E-core 37 is preferably of a laminated type, as shown in FIG. 3, such as are commonly used in transformers. Alternatively, a solid core may be used. The winding 38 is preferably pre-formed on a bobbin 39 adapted to be slipped over the central leg of the E-core 37. Those skilled in the art will appreciate that such components are readily available and relatively inexpensive.

As illustrated in FIG. 2, a pneumatic conduit 40 is further provided in and extends vertically upward adjacent the magnetic E-core 37, as shown, for facilitating passage of a pneumatic fluid through the conduit 40. Preferably this conduit 40 comprises a thin cylindrical sleeve or tube that is inserted into a hole provided in the outer casing 41, as shown in FIG. 3, and extends upward into the space between the winding 38 and the E-core 37, as shown in FIG. 2. At one end of the conduit 40 a restriction orifice 43 is provided, as illustrated in FIG. 3, in order to provide a defined flow of pneumatic fluid through the orifice 43. The other end of the conduit 40 forms a discharge end or nozzle. All of these components are potted within the outer casing 41 using an epoxy or other suitable potting compound.

The uppermost surfaces of the E-core 37 are preferably machined and precision ground such that they are substantially flat and coplanar to within at least about +/−0.0005 inches and, more preferably, to within about +/−0.0002 inches. Preferably, the discharge end of the conduit 40 is also precision ground in situ with the E-core 37 so that the upper most surface of the conduit discharge end and the top surface of the E-core 37 are substantially flat and coplanar to within at least about +/−0.0005 inches and, more preferably, to within about +/−0.0002 inches.

A flapper 45, corresponding to the pivot arm 27 shown schematically in FIGS. 1A and 1B, is provided adjacent the uppermost surfaces of the E-core 37 in close proximity with the discharge end of the conduit 40. The bottom surface of the flapper 45 is also preferably machined and precision ground such that it is flat to within at least about +/− 0.0005 inches and, more preferably, to within about +/−0.0002 inches. Preferably, the flapper 45 is formed as a U-shaped channel, as shown in FIGS. 2 and 3. This shape provides sufficient structural integrity to maintain tolerance of the precision ground bottom surface thereof. A flapper 45 having a box-shaped or I-shaped cross-section may also be used, as desired, but a U-shaped flapper 45 is preferred because of its ease of manufacture, light weight and agility.

The flapper 45 is secured at one end via one or more pins 46, as shown in FIG. 3. At the other end, sufficient freedom of movement preferably is provided such that the flapper 45 can move freely up or down and slightly side to side in response to a pressure force exerted by pneumatic fluid issuing from the discharge end of the conduit 40. A retainer 47 is further provided in close proximity with the flapper 45, as shown, and operates to restrict the movement of the flapper to within predetermined limits. The retainer 47 is secured to the E-core 37 and an adjacent support post 48 via the pins 46 and a screw or similar fastener 49.

The retainer 47 has formed thereon one or more raised surfaces 51 which contact the flapper 45 to restrict the vertical movement thereof. These raised surfaces 51 are preferably precision ground to ensure that the flapper 45 is maintained within a predetermined proximity with the top surface of the E-core 37. Preferably, the raised surface nearest the free end of the flapper 45 provides a vertical clearance of between about 0.005 and 0.015 inches and, more preferably, about 0.008 inches between the flapper 45 and the retainer 47 in order to provide adequate range of operation. The raised surface nearest the fixed end of the flapper 45 preferably provides a vertical clearance of between about 0.0005 and 0.0015 inches and, more preferably, about 0.0010 inches between the flapper 45 and the retainer 47. At least some degree of horizontal clearance between the flapper 45 and the retainer 47 is also provided, although the particular amount is not critical.

The flapper 45 is preferably constructed of a magnetic material such that it will be drawn toward the E-core 37 in response to a magnetic field induced therein. A carpenter's 4750 sheet steel provides a convenient material for forming the flapper 45. Alternatively, it will be readily apparent to those skilled in the art that a wide variety of other magnetic materials may be used for forming the flapper 45 while still enjoying the benefits of the present invention. In contrast, the retainer 47 is preferably formed of a nonmagnetic material, such as 303 or 304 austenitic stainless steel, such that it will not divert the magnetic flux flowing through the flapper 45 when the winding 38 is energized. Again, other materials such as brass, copper or aluminum may be used for the retainer 47, as desired, while still enjoying the benefits of the present invention.

Application of a voltage across the winding 38 causes a current flow which energizes the winding. A winding selected to have a magnetizing current of between about 1 and 5 Amp-turns and, more preferably, between about 2 and 3 Amp-turns provides a convenient range for most applications. Alternatively, those skilled in the art will readily appreciate that the present invention may be scaled, as needed, to suit a particular purpose. Thus, larger or smaller capacity windings 38 may be used, as desired, while still enjoying the benefits of the present invention.

In operation, pneumatic fluid under pressure is introduced into the conduit 40 through the restriction orifice 43. Pneumatic fluid enters through the lower end of the conduit 40 adjacent the E-core 37 wherein it is allowed flow upward and discharge through the discharge portion thereof. When the winding 38 is substantially unenergized, the flapper 45 is freely movable such that it easily deflects in response to the pressure force of the pneumatic fluid issuing from the conduit 40. In that case, only a small-back-pressure or control pressure $P_c$ is created in the conduit 40 between the discharge portion and the restriction orifice 43.

On the other hand, energizing the winding 38 induces a magnetic field which pulls the flapper 45 toward the E-core 37, partially or fully occluding the discharge end of the conduit 40. Depending upon the magnitude of the control voltage $V_c$ and the resulting intensity of the induced magnetic field, this creates a control back-pressure $P_c$ in the conduit 40 corresponding to a predetermined gain factor $k_v$ of the control valve. This control back-pressure $P_c$ may be used to control a pneumatic load directly or, more preferably, it may be provided to a pneumatic "booster" for controlling a large pneumatic load, such as a hydraulic valve.

Figure 4:
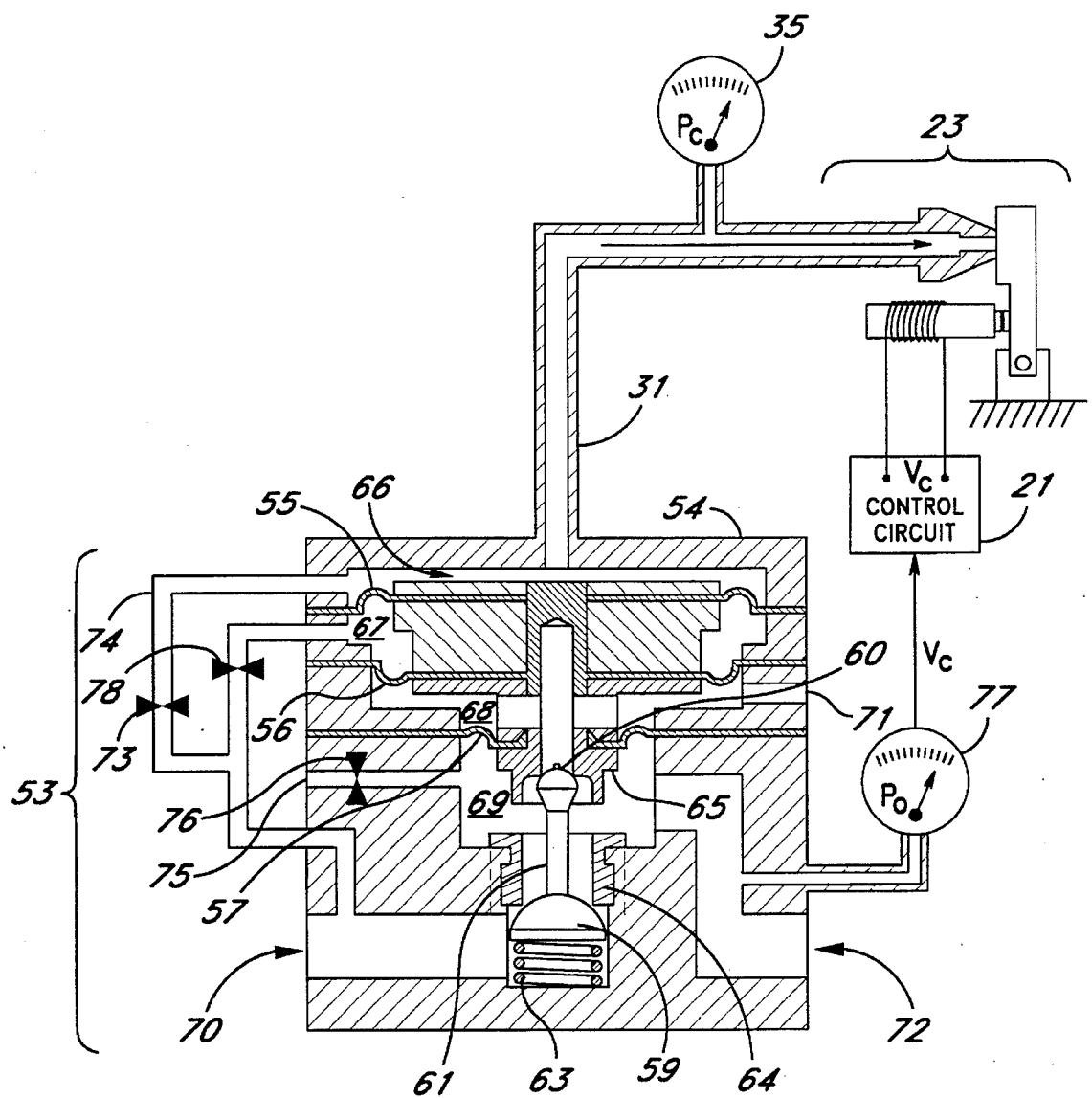
FIG. 4 is a partial schematic drawing of the electro-pneumatic control system of FIG. 1 further incorporating a pneumatic booster.

FIG. 4 is a partial schematic drawing illustrating the preferred use of pneumatic booster 53 in accordance with the present invention. The booster 53, shown here in partial cross-section, is a single-stage pneumatic booster having 5:1 gain. It consists primarily of a housing 54, a plurality of diaphragms 55–57, an intake valve 59, and an exhaust valve 60. The intake and exhaust valves 59 and 60 are mounted on a common stem 61, as shown, and are spring biased towards their respective closed positions via a compression coil spring 63. The intake valve seat 64 is fixed with respect to the booster housing 54, as shown. The exhaust valve seat 65 is movable with the diaphragm 57.

Between the upper diaphragm 55 and the booster housing 54 is formed a first chamber 66 in fluid communication with the conduit 31 of the pneumatic control valve 23, as shown. Between the middle diaphragm 56 and the upper diaphragm 55 is formed a second chamber 67 in fluid communication with the inlet side conduit 70. Between the middle an lower diaphragms 56 and 57 is formed a third chamber 68 which is vented to the atmosphere or some other convenient reference pressure, as desired, through a ventilation conduit 71 passing through the wall of the housing 54, as shown. Between the lower diaphragm 57 and the booster housing 54 is formed a fourth chamber 69 in fluid communication with the outlet side conduit 72 of the booster 53.

Between the supply side conduit 70 and the chamber 66 is provided a small conduit 74 in which is disposed a first restriction orifice 73. Note that the restriction orifice 73, shown here schematically, corresponds to the restriction orifice 33 shown in cross-section in FIGS. 1A and 1B. The particular placement of the restriction orifice 73 is relatively unimportant, although it is desirable to keep the volume of pneumatic fluid in the conduit 74 between the restriction orifice 73 and the chamber 66 as small as possible. The restriction orifice 73 may be disposed in the housing 54 of the booster 53 or, alternatively, it may be disposed in the control valve 23, as desired. The restriction orifice 73 is illustrated here schematically for illustrative purposes.

A restriction orifice 73 comprising a precision manufactured sapphire orifice is particularly preferred for purposes of durability and resistance to abrasion. A round sapphire restriction orifice having an inner diameter of between about 0.004 and 0.020 inches and, more preferably, about 0.013 inches provides a convenient size for most applications. Other types or sizes may be used, as desired, while still enjoying the benefits of the present invention. If desired, a spring-loaded clean-out plunger may further be provided adjacent the restriction orifice to periodically remove debris from the orifice opening, such as will be described in more detail later in connection with FIG. 11.

Operation of the booster may be understood as follows. Line pressure is applied to the supply side conduit 70 of the booster 53. Pneumatic fluid at line pressure flows through the smaller conduit 74 through the restriction orifice 73, wherein it is allowed to enter the first chamber 66. The pressure in the chamber 66 is regulated according to the control pressure $P_c$ produced in the conduit 31, as described previously.

Ignore for the moment the effects of the second chamber 67. If the pressure force exerted on the diaphragm 55 exceeds the sum of opposing forces exerted on the diaphragm 57 by the pressure in the output chamber 69, the pressure exerted on the intake valve 59 and the compression force of spring 63, then the diaphragms 55–57 will be displaced slightly downward, as shown, causing the intake valve 59 to become open. In this condition pneumatic fluid is allowed to flow from the supply side conduit 70 through the intake valve 59 to the output chamber 69 and to the outlet side conduit 72 of the booster 53. On the other hand, if the pressure force exerted on the diaphragm 55 is less than the sum of opposing forces exerted on the diaphragm 57, then the diaphragms 55–57 will be displaced slightly upward, allowing pneumatic fluid to pass from the chamber 69 to the chamber 68 wherein it is vented to the atmosphere through the ventilation conduit 71.

For a static load such as a hydraulic valve, a static equilibrium will be achieved for a given control pressure signal $P_c$ from the control valve 23 when the pressure in the output chamber 69 increases just sufficiently to cause the intake valve 59 to close. For a dynamic load, such as a pneumatic motor or a changing static load, a dynamic equilibrium will be reached for a given control pressure $P_c$ when the downward pressure force exerted on the upper diaphragm 55 is just equal to the upward pressure force exerted on the lower diaphragm 57. In this condition the intake valve 59 will be partially open, as shown, admitting a steady flow of pneumatic fluid into the chamber 67 and to the output side conduit 72. Again, this ignores the effects of the second chamber 67.

The second chamber 67 is a biasing chamber designed to bias the output pressure of the booster 53 in accordance with a predetermined offset or bias amount ($P_b$). This biasing pressure is effected by the difference in area between the upper diaphragm 55 and the middle diaphragm 56. The result is a net upward force on the diaphragm assembly which tends to keep the intake valve 59 closed in the absence of at least a threshold control pressure $P_c$ applied to the upper chamber 66. This pressure offset ensures proper low-end performance and also allows the control valve 23 to work in a range of greater efficiency and accuracy. It also helps maintain the balance of forces over a range of possible supply pressures ranging from 20 to 40 psi. A pressure offset of between about 3.0 and 7.0 psi and, more preferably, about 5.0 psi provides adequate offset for most applications.

Optionally, a second restriction orifice 76 may be provided in a ventilation conduit 75 formed between the output chamber 69 and the atmosphere. This is preferably provided as a "bleeder" to bleed pneumatic fluid from the output chamber 69. The effect of this bleeder is to provide a continuous flow of pneumatic fluid from the output chamber 69 to the atmosphere. This keeps the inlet valve 59 at least slightly open during steady state operation of a static load, thereby avoiding or mitigating the effects of hysteresis or "deadband" caused by opening and closing the valve 59. A third restriction orifice 78 may optionally be provided between the biasing chamber 67 and the inlet side conduit 70 as a dampener. It will be appreciated that the restriction orifice 78 will attenuate the effects of supply pressure fluctuations which could otherwise cause undesirable noise or resonance effects on the output pressure of the booster 53.

For steady-state equilibrium operation, the pressure output $P_o$ of the booster 53 will be roughly proportional to the input control pressure $P_c$, less an offset or bias amount $P_b$, multiplied by a desired gain factor $k_b$. This may be expressed algebraically as follows:

$$P_o = (P_c - P_b)k_b$$

Depending upon the desired pressure output, the booster 53 may be configured to provide a range of possible pressure gains $k_b$. Persons skilled in the art will appreciate, for instance, that the gain factor $k_b$ of the booster 53 may be varied by adjusting the ratio of the diameters of the upper and lower diaphragms 55 and 57. A booster gain $k_b$ of between about 4.0 and 6.0 and, more preferably, about 5.0 produces acceptable results for most applications.

In accordance with the present invention, a pressure sensor 77, shown here schematically for illustrative purposes, is further provided in fluid communication with the output side conduit 72. It will be appreciated that the sensor 77 is adapted to sense the output pressure response $P_o$ of the pneumatic booster 53 and provide a corresponding electrical feedback signal $V_o$ to the control circuit 21, as shown. Preferably, the sensor 77 is a microchip pressure transducer or other solid-state pressure sensing device mounted directly in the booster housing 53 near the output side conduit 72 and having a variable sensitivity or gain of $k_s$. Alternatively, it will be readily apparent to those skilled in the art that a wide variety of other sensing devices may be used, as desired, while still enjoying the benefits of the present invention. Advantageously, the electrical feedback signal $V_o$ provided by the sensor 77 enables the control circuit 21 to maintain highly accurate closed-loop PID control of the output pressure response $P_o$ of the booster 53, as will now be described.

Figure 5:
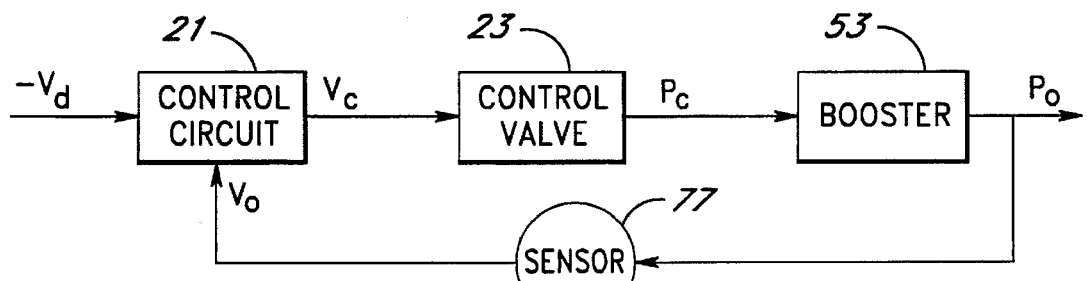
FIG. 5 is a simplified control block diagram of an electro-pneumatic control system having features of the present invention.

FIG. 5 is a simplified control block diagram of an electro-pneumatic control system having closed-loop PID feedback characteristics in accordance with the present invention. Briefly, an input command voltage signal $-V_d$, corresponding to a particular desired pressure output response $P_o$, is provided to the control circuit 21. The control circuit 21, in turn, generates a control voltage $V_c$ for driving the control valve 23, as previously described. The control valve 23 produces a corresponding control pressure $P_c$ which is provided to the booster 53. The output pressure response $P_o$ of the booster 53 is sensed by a sensor 77, converted into an electrical signal $V_o$, and fed back to the control circuit 21, as shown.

Thus, it may be seen that a first voltage signal $-V_d$ is provided to the control circuit 21, corresponding to a particular desired pressure output response $P_o$. A second voltage signal $V_o$ is also provided to the control circuit 21, corresponding to the observed output pressure response $P_o$. The control circuit 21 has a predetermined transfer function such that it generates a control voltage response $V_c$ having defined proportional, integral and derivative (PID) feedback components based upon the observed difference or "error" between the input command voltage signal $-V_d$ and the feedback voltage signal $V_o$. The preferred transfer function is described below.

Figure 6:
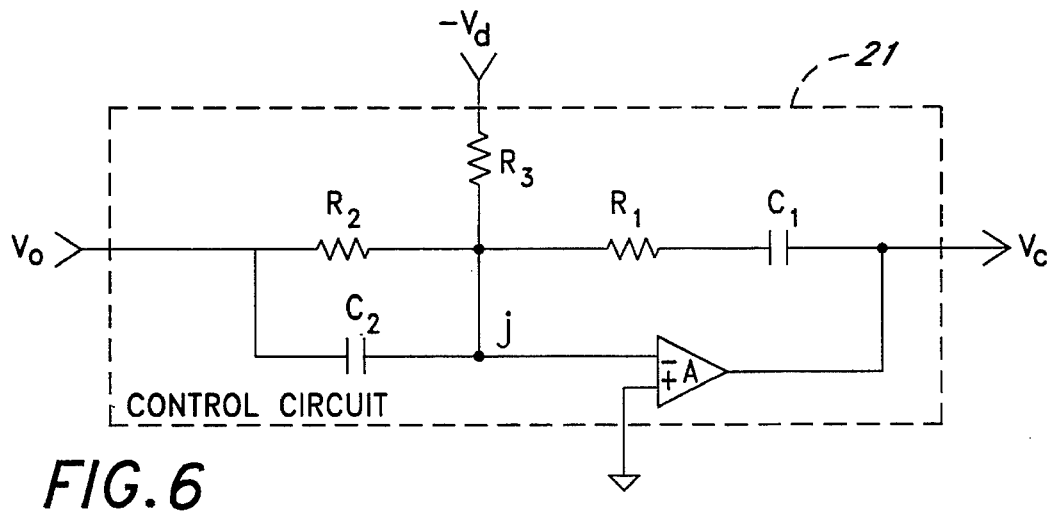
FIG. 6 is a simplified electrical schematic diagram of a control circuit having features of the present invention.

FIG. 6 is a simplified electrical schematic diagram of the control circuit 21 having features of the present invention. For convenience in later discussions, individual electrical components are denoted using conventional letter designations (e.g., "R" for resistor, "C" for capacitor, etc.) with numeric subscripts added, as needed, to distinguish like components. The underlying circuit comprises a single inverting op-amp (A), the negative terminal of which is coupled to an R-C network including resistors $R_1$, $R_2$, and $R_3$, and capacitors $C_1$ and $C_2$. Additional op-amps may be used, as desired. It is preferred, however, to use a single op-amp, as shown. This minimizes costs, provides a relatively simple and robust circuit design and provides inherent stability characteristics, as will be described in more detail later.

Resistor $R_1$ and capacitor $C_1$ are coupled in series between the output terminal and the inverting input terminal of the op-amp A. Resistor $R_2$ and capacitor $C_2$ are coupled in parallel between the voltage input terminal $V_o$ of the control circuit 21 and the inverting input terminal of the op-amp A. Resistor $R_3$ is coupled between the input command terminal $-V_d$ and the inverting input terminal of the op-amp A, as shown. A current summation junction (j) is formed at the inverting input terminal of the op-amp A, as shown. For convenience in later calculations, current flowing out of the junction (j) will be designated as positive current. Current flowing into the junction (j) will be designated as negative current.

Applying Kirchhoff's law at the junction (j) yields the following equation, which represents the response of the control circuit 21:

$$\frac{-V_d}{R_3} + V_o\left(\frac{1}{R_2} + SC_2\right) + \frac{V_c}{R_1 + (1/SC_1)} = 0$$

For the transient response, the input command voltage $-V_d$ is assumed to be zero. Collecting terms and solving for the output response yields the following expression of the transfer function $V_c/V_o$ of the control circuit 21:

$$V_c/V_o = -\left(\frac{1}{R_2} + SC_2\right)\left(R_1 + \frac{1}{SC_1}\right)$$

By expanding the above equation and gathering like terms it may be reduced to the following simplified polynomial expression:

$$V_c/V_0 = -\left[\left(\frac{R_1}{R_2} + \frac{C_2}{C_1}\right) + \left(\frac{1}{R_2C_1}\right)\frac{1}{S} + (R_1C_2)S\right]$$

or $$V_c/V_o = -\left[A_P + A_I\left(\frac{1}{S}\right) + A_D(S)\right]$$

where:

$A_P$=proportional feedback coefficient $A_I$=integral feedback coefficient $A_D$=derivative feedback coefficient Thus, the preferred transfer function corresponds to at least a second order system having proportional, integral and derivative feedback components as determined by the above coefficients. Alternatively, it will be readily apparent to those skilled in the art that similar or higher order transfer functions may be used while still enjoying the benefits of the present invention.

Operation of the control circuit 21 may be understood as follows. The input command voltage signal $-V_d$ is applied across the resistor $R_3$ such that it draws current from the summation junction j. The magnitude of this current corresponds to a particular desired pressure output response of the pneumatic booster. The pressure sensor feedback voltage signal $V_o$ is applied across resistor $R_2$ such that it forces current flow into the summation junction j. This current is proportional to the observed pressure output of the booster. Preferably, the resistors $R_2$ and $R_3$ are substantially equal such that the difference in the currents flowing through the resistors $R_2$ and $R_3$ corresponds to the observed error of the electro-pneumatic control system.

Due to the feedback characteristics of the control circuit operating through series coupled resistor $R_1$ and capacitor $C_1$, it will be appreciated that the voltage on the inverting input terminal of the op-amp A is driven to zero. Ignore for the moment the effect of capacitor $C_2$. The net current flowing through resistors $R_2$ and $R_3$ corresponds to the observed error of the system. Op-amp A will increase or decrease its output response until the current through the series coupled resistor $R_1$ and capacitor $C_1$ is equal and opposite to the net current through resistors $R_2$ and $R_3$. Thus, the output control voltage signal $V_c$ has a component that is proportional to the observed error of the system or, in other words, the control circuit 21 provides proportional feedback. Proportional feedback is desirable for increasing the steady-state accuracy of a control system in accordance with the present invention.

Those skilled in the art will further appreciate that resistor $R_1$ and capacitor $C_1$ coupled in series between the output and inverting input terminals of op-amp A operate to integrate the observed error corresponding to the difference of current flow through resistors $R_2$ and $R_3$. In particular, as current flows through resistor $R_1$ and capacitor $C_1$ in series, capacitor $C_1$ charges either positively or negatively corresponding to the integral of current flow therethrough. Thus, thee output control voltage signal $V_c$ has a component that is proportional to the integral of the observed error of the system such that the control circuit 21 provides integral feedback. Integral feedback is desirable for eliminating steady-state error in a pneumatic control system in accordance with the present invention.

Derivative feedback control is also provided through the effect of capacitor $C_2$ provided between the feedback terminal $V_o$ and the inverting input terminal of the op-amp A. Those skilled in the art will appreciate that the current flow through capacitor $C_2$ will be proportional to the derivative of the feedback voltage signal $V_o$. In this manner, a component of derivative feedback control is provided. Derivative feedback is desirable for increasing the stability of a pneumatic control system in accordance with the present invention and for reducing system overshoot.

Thus, a control circuit in accordance with the present invention achieves PID feedback control. Unlike conventional PID control, however, the present invention allows the three feedback paths to share a common node at the junction (j) forming the inverting input terminal of the inverting op-amp A. This has been observed to produce certain unexpected and synergistic effects resulting in the further stabilization of the control system over a range of possible load conditions. It will be appreciated, for instance, that the capacitor $C_2$ affects not only derivative feedback, but also the component of proportional feedback provided. The resistor R2 similarly affects both proportional and integral feedback. The resulting interdependence of proportional, integral and derivative feedback loops advantageously allows a control system that is surprisingly stable over a wide range of possible loads.

For example, in a conventional PID control circuit a large error signal over a sustained period of time could cause significant integrator windup and overshoot as the integrator continues to accumulate the error signal even though the control valve may be saturated. These effects occur when the load capacity demands full output for a sufficient period of time such that the PID servo system saturates. During the saturation recovery time, the circuit does not perform as intended. The system no longer represents the mathematical models and formula that predict acceptable behavior. Integrator windup is undesirable because it causes a time shift in the feedback path due to the length of time it takes for the integrator to "unwind." Among other things, this can cause large overshoots in the output response which can add significantly to the wear and tear of the control elements.

Conventional PID control circuits have attempted to compensate for integrator windup by adding sophisticated anti-windup circuitry. Typically, this entails electronically disconnecting the integrator from the circuit when saturation is detected and then reconnecting the integrator once the circuit has stabilized. The task of determining how and when to enable and disable the integrator function required complicated circuitry as well as certain performance compromises. The addition of sophisticated anti-windup circuitry increases the expense of the control system, and the additional components decrease reliability.

In contrast, a pneumatic control system constructed in accordance with the present invention is inherently resistant to the effects of integrator windup. Because the integrator function is combined with the proportional function in one series RC feedback network, the saturated system instantly becomes dominated by the proportional gain function upon reaching the zero error state. The wound-up integrator is then allowed to unwind without causing significant error in the output response because the high proportional gain maintains the output at very nearly the exact desired value. The integrator proceeds to reduce the steady-state error to zero after it has unwound. The polarity of the saturated integrator will always be such that the proportional stage is free to swing throughout the entire range of output voltages, even while the integrator is unwinding. This makes the control system surprisingly stable. It is more stable when overloaded and it recovers more gracefully than prior art systems.

Assume, for instance, that a large error signal were encountered which caused the control valve 23 of FIG. 5 to saturate. Initially, the control circuit shown in FIG. 6 would begin integrating the observed error between the input command voltage $-V_d$ and the observed output response signal $V_o$ based on the differential of current entering into the junction j. Once the output response begins to increase, however, the derivative feedback loop provided through the capacitor $C_2$ also begins to deliver current into the junction j, in effect reducing the apparent error of the system. Thus, the total integrated error is reduced, thereby preventing significant integrator windup. Moreover, the output moves immediately in response to the input changes. The control system does not have to wait for the integrator to unwind. Advantageously, a control circuit 21 having this feature in accordance with the present invention can accommodate a much wider range of possible loads having different input requirements and ranges of operation without requiring adjustment or tuning.

Those skilled in the art will also appreciate that the derivative feedback loop through the capacitor $C_2$ responds only to changes in the feedback voltage signal $V_o$ corresponding to the output pressure response $P_o$. The derivative feedback loop is substantially unaffected by changes in the input command voltage signal $-V_d$, corresponding to a particular desired pressure response. Advantageously, this feature of the present invention further enhances the stability of the resulting control system by avoiding potential system overload in response to a large step-wise change in the input command voltage -signal $V_d$.

The particular response characteristics of the resulting control system can be varied, as desired, by appropriately selecting the various components $R_1$, $R_2$, $R_3$, $C_1$ and $C_2$, as described in more detail below.

Figure 7:
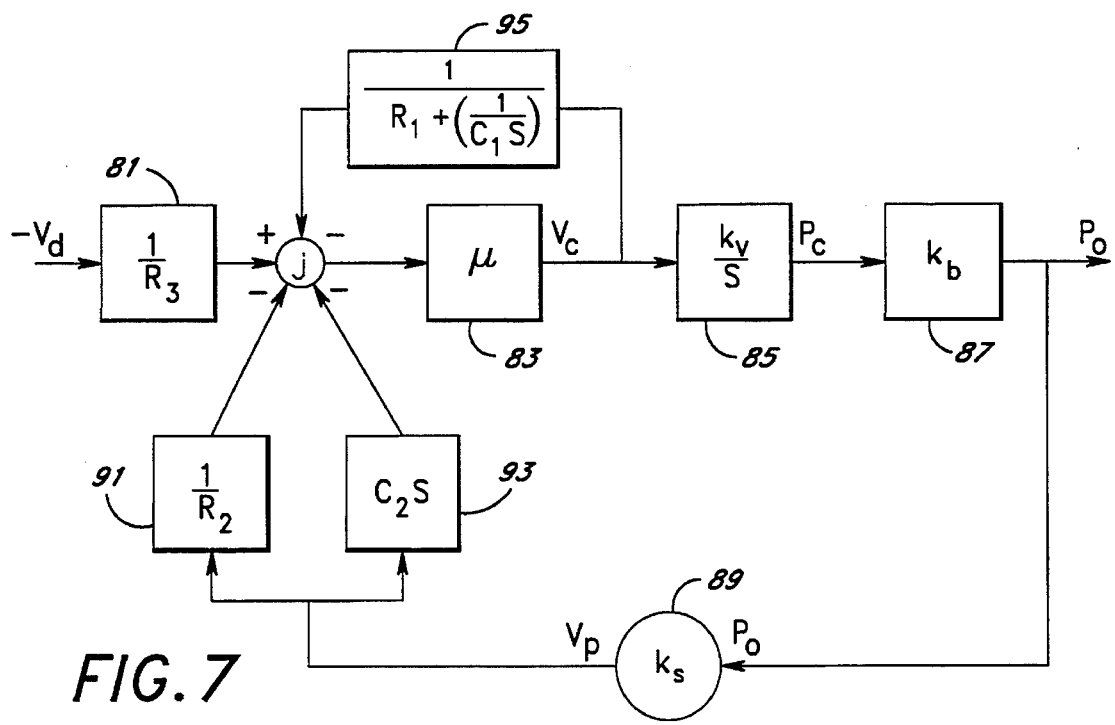
FIG. 7 is a more detailed control block diagram of the electro-pneumatic control system of FIGS. 5.

FIG. 7 is a more detailed control block diagram of an electro-pneumatic control system having features of the present invention. The forward loop control path is through control elements 81, 83, 85 and 87, as shown. Control element 81 corresponds to the resistor $R_3$ shown in FIG. 6. Control element 83 corresponds to the op-amp A having gain $\mu$. Control elements 85 and 87 correspond to the control valve 23 and the booster 53 having gain $k_v$ and $k_b$, respectively.

Two feedback loop control paths are provided. The outer feedback loop provides proportional and derivative feedback based on the output $P_o$ of control element 87. This is provided through feedback control element 89, corresponding to the sensor 77 in FIGS. 4 and 5 having gain $k_s$, and two feedback elements 91 and 93, as shown, corresponding to resistor $R_2$ and capacitor $C_2$ shown in FIG. 6. The inner feedback loop provides integral feedback from the output of the op-amp 83, contained within the forward loop path, through the feedback element 95, as shown. Feedback element 95 corresponds to the series impedance through series coupled resistor $R_1$ and capacitor $C_1$ shown in FIG. 6.

The closed-loop transfer function of the resulting control system may be generally stated as follows:

$$W(S) = \frac{N(S)}{D(S)} = \frac{G}{1+GH}$$

where:

W=transfer function of the system expressed in the Laplace domain;

G=equivalent forward loop gain; and

H=equivalent feedback loop gain.

The equivalent forward loop gain G through control elements 83, 85, 87, and 95 may be expressed as follows:

$$G = \frac{1}{\frac{1}{\mu} + \left(\frac{C_1 S}{1+R_1 C_1 S}\right)} \left(\frac{k_v}{S}\right)(k_b)$$

Since the gain ($\mu$) of op-amp A is very large, the above equation reduces to:

$$G = \left(\frac{1+R_1 C_1 S}{C_1 S}\right)\left(\frac{k_v k_b}{S}\right)$$

The equivalent feedback gain (H) through control elements 89, 91, and 93 may similarly be expressed as follows:

$$H = (k_g)\left(\frac{1}{R_2} + C_2 S\right)$$

Substituting variables in the above equations, the closed-loop transfer function of the system is expressed as:

$$W(S) = \frac{G}{1+GH} = \frac{\left(\frac{1+R_1 C_1 S}{C_1 S}\right)\left(\frac{k_v k_b}{S}\right)}{1+\left(\frac{1+R_1 C_1 S}{C_1 S}\right)\left(\frac{k_v k_b}{S}\right)(k_s)\left(\frac{1}{R_2}+C_2 S\right)}$$

The denominator D(s) of the above transfer function W(s) defines the characteristic equation of the control system. This may be simplified as follows:

$$D(S) = 1 + (K)\left[\frac{\left(S+\frac{1}{R_1 C_1}\right)\left(S+\frac{1}{R_2 C_2}\right)}{S^2\left(\frac{1}{R_1 C_2}\right)}\right]$$

where:

$K=k_v k_b k_s$=closed-loop gain of the system

Figure 8:
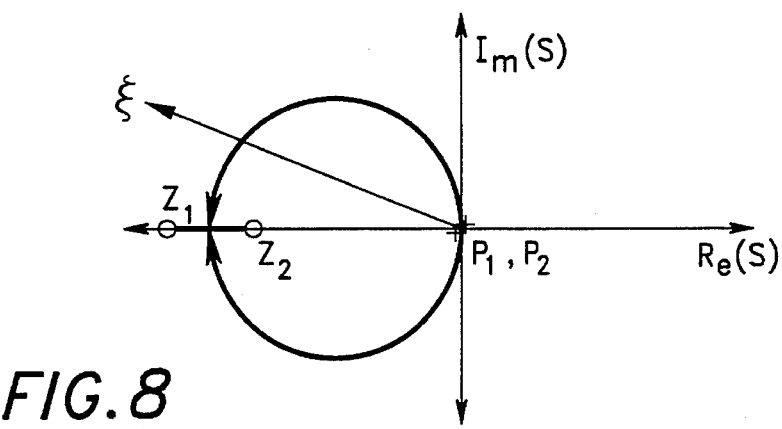
FIG. 8 is a root-locus diagram of the control system of FIG. 7.

The above that the characteristic equation has two poles, $P_1$ and $P_2$, both at S=0 and two zeros, $Z_1$ and $Z_2$, at $S=-1/R_1 C_1$ and $S=-1/R_2 C_2$, respectively. A sketch of the corresponding root locus diagram is illustrated in FIG. 8. It will be appreciated that the root locus represents all values of S in the Laplace domain for which the characteristic equation 1+KG(S)=0 is satisfied as the closed-loop gain K is varied from zero to infinity. From the root locus diagram it may be observed that all of the roots of the system lie on the left side of the imaginary axis in the S plane. This indicates that the system is unconditionally stable for all possible values of closed loop gain K.

The root locus begins at the origin at the poles $P_1$ and $P_2$ with the closed loop gain K being equal to zero. The root locus then branches off into complex conjugate pairs, as shown, reconverging on the negative real axis at an arrival point located between the real zeroes $Z_1$ and $Z_2$. This arrival point occurs at a point along the negative real axis where the closed-loop gain K is at a relative minimum. The root locus then continues outward along the negative real axis toward the real zeroes $Z_1$ and $Z_2$ as the closed-loop gain K is increased further toward infinity.

The particular shape of the transient response of the pneumatic control system described above may be varied, as desired, by appropriately selecting the location of the poles $P_1$ and $P_2$ and the zeroes $Z_1$ and $Z_2$, and the closed loop gain K. Each of these may be varied, as desired, according to well-known PID feedback control system tuning techniques such as taught by Ziegler-Nichols. See, e.g., Gene F. Franklin, et. al., *Feedback Control of Dynamic Systems*, pp. 103–106.

As noted above, pole and zero locations are determined by selecting the various components $R_1$, $R_2$, $R_3$, $C_1$ and $C_2$. Preferred component values are listed below in TABLE 1 for illustrative purposes only:

TABLE 1

| | |
|---|---|
| $R_1$ | 4.7 M$\Omega$ |
| $R_2$ | 200 k$\Omega$ |
| $R_3$ | 200 k$\Omega$ |
| $C_1$ | .056 $\mu$F |
| $C_2$ | .056 $\mu$F |

For these particular preferred component values, the characteristic equation of the control system will have two poles $P_1$ and $P_2$ at S=0 and two zeros $Z_1$ and $Z_2$ at S=−3.8 and S=−89.3, respectively. Through trial-and-error calculation, the arrival point of the root locus on the negative real axis, as shown in FIG. 8, will occur at about −7.3, corresponding to a closed-loop gain K of about 0.706.

While these particular component values and corresponding pole and zero locations are preferred, those skilled in the art will readily appreciate that a wide variety of other component values and corresponding poles and zeroes may be used while still enjoying the benefits of the present invention. Preferably, however, the poles $P_1$ and $P_2$ are substantially real and equal and are located to the right of the zeros $Z_1$ and $Z_2$ in the Laplace domain, as shown in FIG. 8. The zeroes $Z_1$ and $Z_2$ are preferably substantially real and unequal and are located to the left of the poles $P_1$ and $P_2$, as shown.

The closed loop gain K of the control system may also be varied, as desired, but is preferably selected to produce either a critically damped or slightly underdamped system. A damping ratio $\zeta$ of between about 0.3 and 1.0 and, more preferably, about 0.5 provides a convenient compromise for most pneumatic control system applications. A damping ratio $\zeta$ of 0.5, for instance, corresponds to a closed loop gain K of about 0.32. Alternatively, those skilled in the art will readily appreciate that larger or smaller damping ratios or closed loop gains may be used, as desired, while still enjoying the benefits of the invention.

The closed-loop gain K may be smaller or larger than the open loop gain $k_v k_b$, corresponding to the combined gain of the control valve 23 and booster 53 shown in FIG. 5. The latter will depend upon, among other things, the particular pressure and flow requirements of the pneumatic load to be controlled. Preferably, the gain ks of the sensor element 89 in FIG. 7 is adjustable to accommodate for higher or lower open loop gain, as desired, while maintaining consistent overall system behavior and dynamic response.

FIGS. 9A–9D are graphs in the time domain of the observed dynamic response of a pneumatic control system constructed in accordance with the present invention compared to the corresponding response of a typical prior art pneumatic control system. Briefly, the dynamic response of a control system may be described using several well known parameters. One parameter is the rise time ($t_r$). This corresponds to the time it takes for the output response to rise and remain within 10% of the desired output. A related parameter is decay time ($t_d$). This is the time it takes for the output response to fall and remain within 10% of the desired output. All other things being equal, faster rise and decay times are preferred in order to provide a faster response to changing system conditions.

Figure 9A:
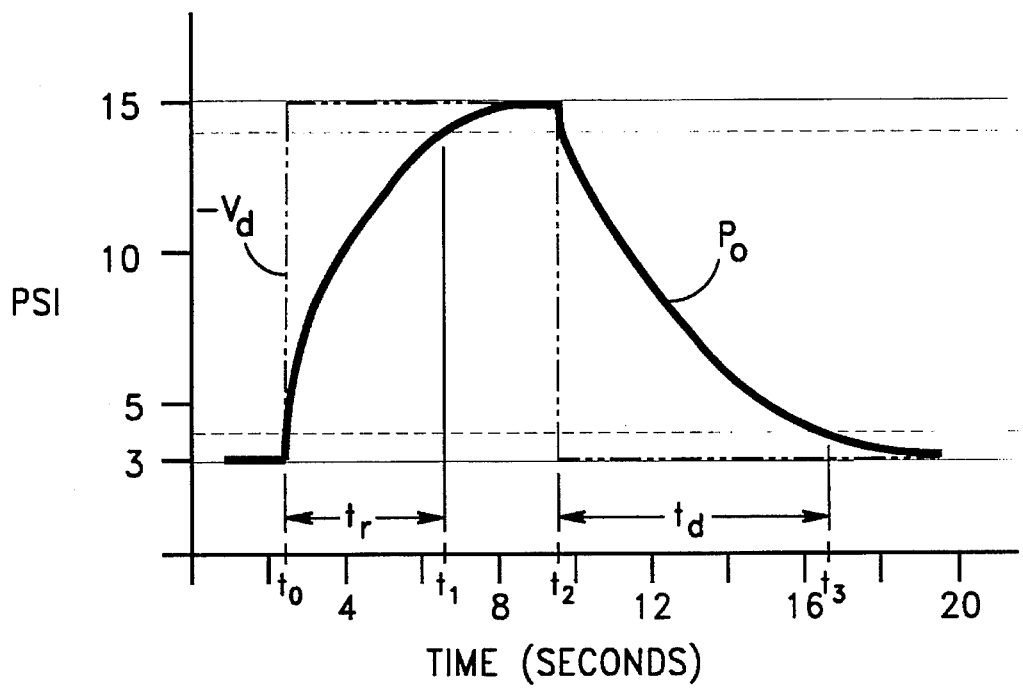
FIGS. 9A–9D are graphs of measured output responses of an electro-pneumatic control system constructed in accordance with the present invention compared with the measured output response of a typical prior art pneumatic control system.
Figure 9B:
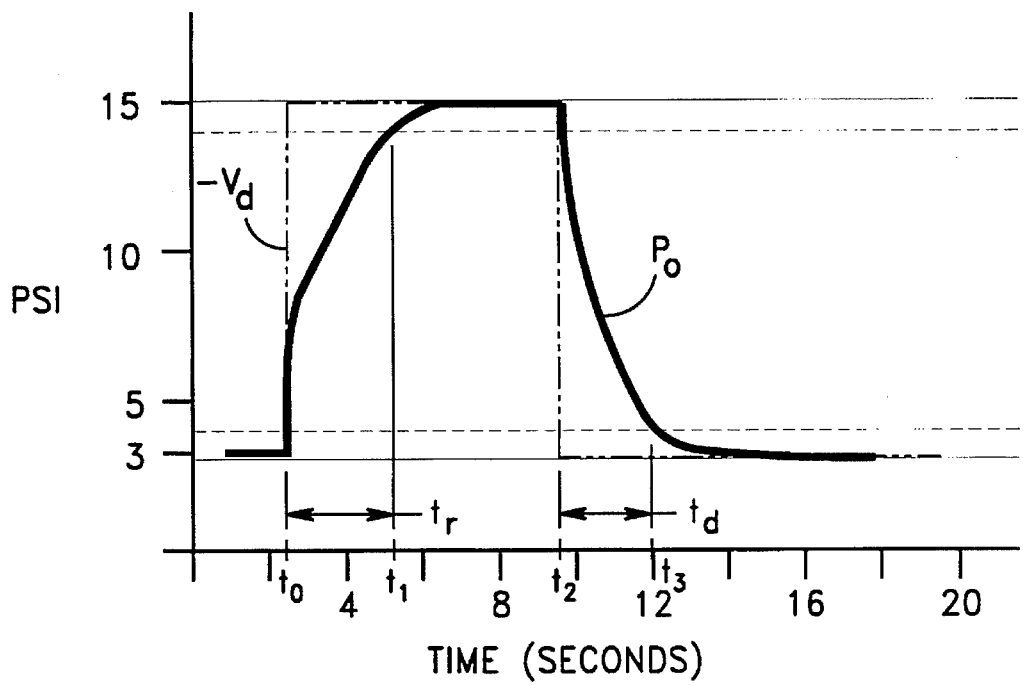

FIGS. 9A and 9B are graphs of the dynamic responses of two different pneumatic control systems each operating a static 3.0L pneumatic load. FIG. 9A represents the measured dynamic response of a typical prior art pneumatic control system. FIG. 9B represents the measured dynamic response of a control system constructed in accordance with the present invention. In each case, the input command voltage signal $-V_d$ is a square wave starting at about time $t_0=2.5$ seconds and about 3 psi, rising to about 15 psi for about 7 seconds and ending at about time $t_2=9.5$ seconds at 3 psi. As stated above, this voltage $V_o$ corresponds to the desired output pressure $P_o$.

The graphs show that a control system constructed in accordance with the present invention had both a faster rise time ($t_r$) and decay time ($t_d$) when compared with the prior art control system controlling a 3.0L static load. FIG. 9A shows that the prior art system had rise and decay times of about 4.1 and 7.2 seconds, respectively. In contrast, FIG. 9B shows that the control system in accordance with the present invention had rise and decay times of about 2.9 and 2.6 seconds, respectively. Thus, the present invention represents a significant improvement over prior art systems.

Figure 9C:
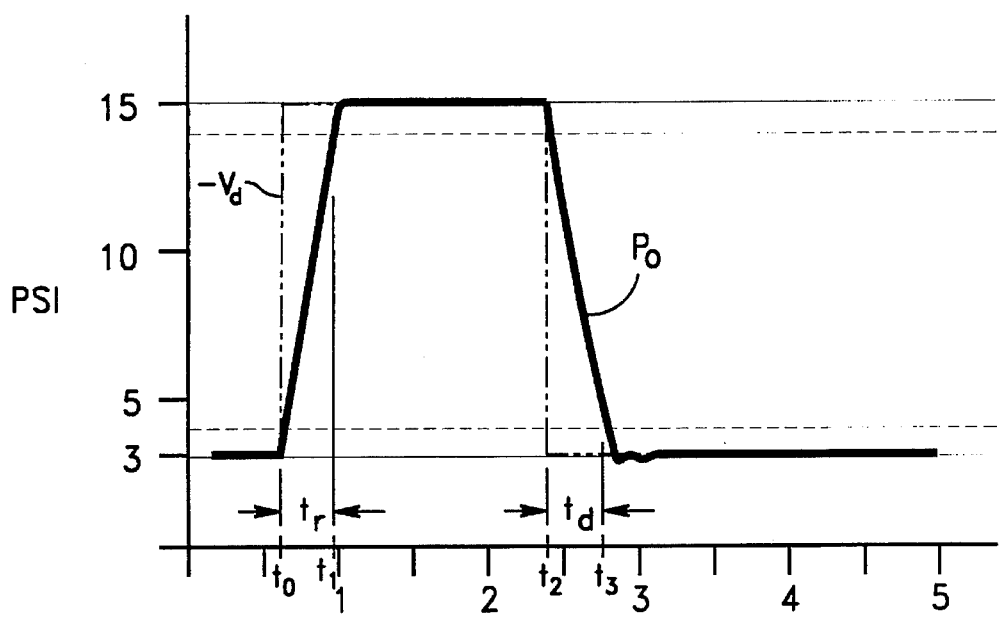
Figure 9D:
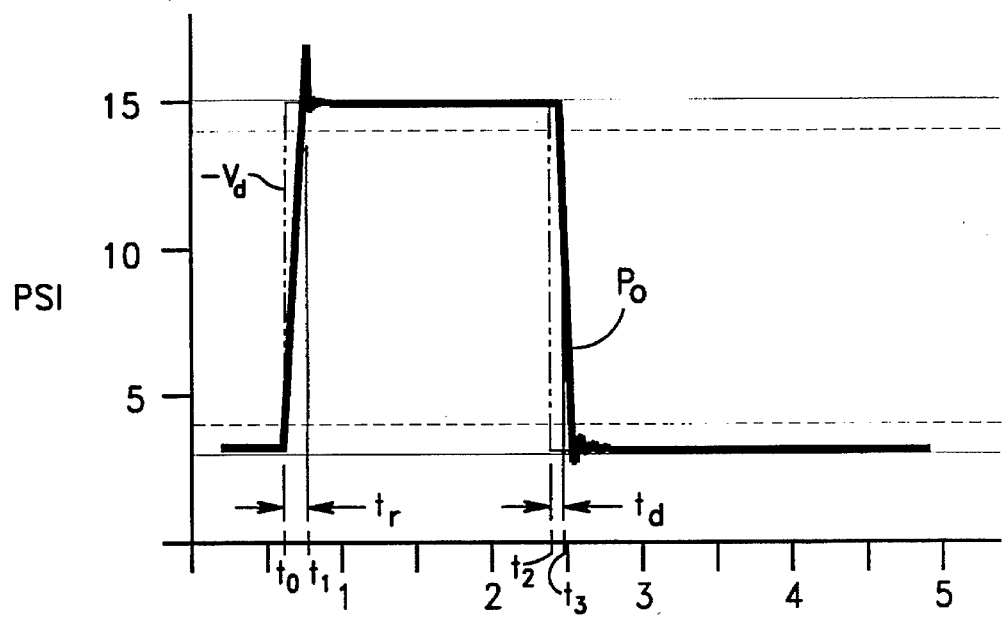

FIG. 9C represents the dynamic response of a typical prior art pneumatic control system controlling a static 0.1L pneumatic load. FIG. 9D represents the dynamic response of the control system constructed in accordance with the present invention controlling a static 0.1L pneumatic load. In this case the input command voltage $-V_d$ is a square wave starting at about time $t_0=0.6$ seconds and about 3 psi, rising to about 15 psi for about 1.8 seconds and ending at about time $t_2=2.4$ seconds at 3 psi.

Again, the graphs show that a control system in accordance with the present invention had both a faster rise time ($t_r$) and decay time ($t_d$) when compared to the prior art control system when controlling a 0.1L static load. FIG. 9C shows that the prior art system had rise and decay times of about 0.4 seconds. In contrast, FIG. 9D shows that the control system in accordance with the present invention had rise and decay times of about 0.2 seconds and 0.1 seconds, respectively. Thus, in each case, the pneumatic control system constructed in accordance with the present invention exhibited better dynamic performance than the typical prior art pneumatic control systems.

Figure 10:
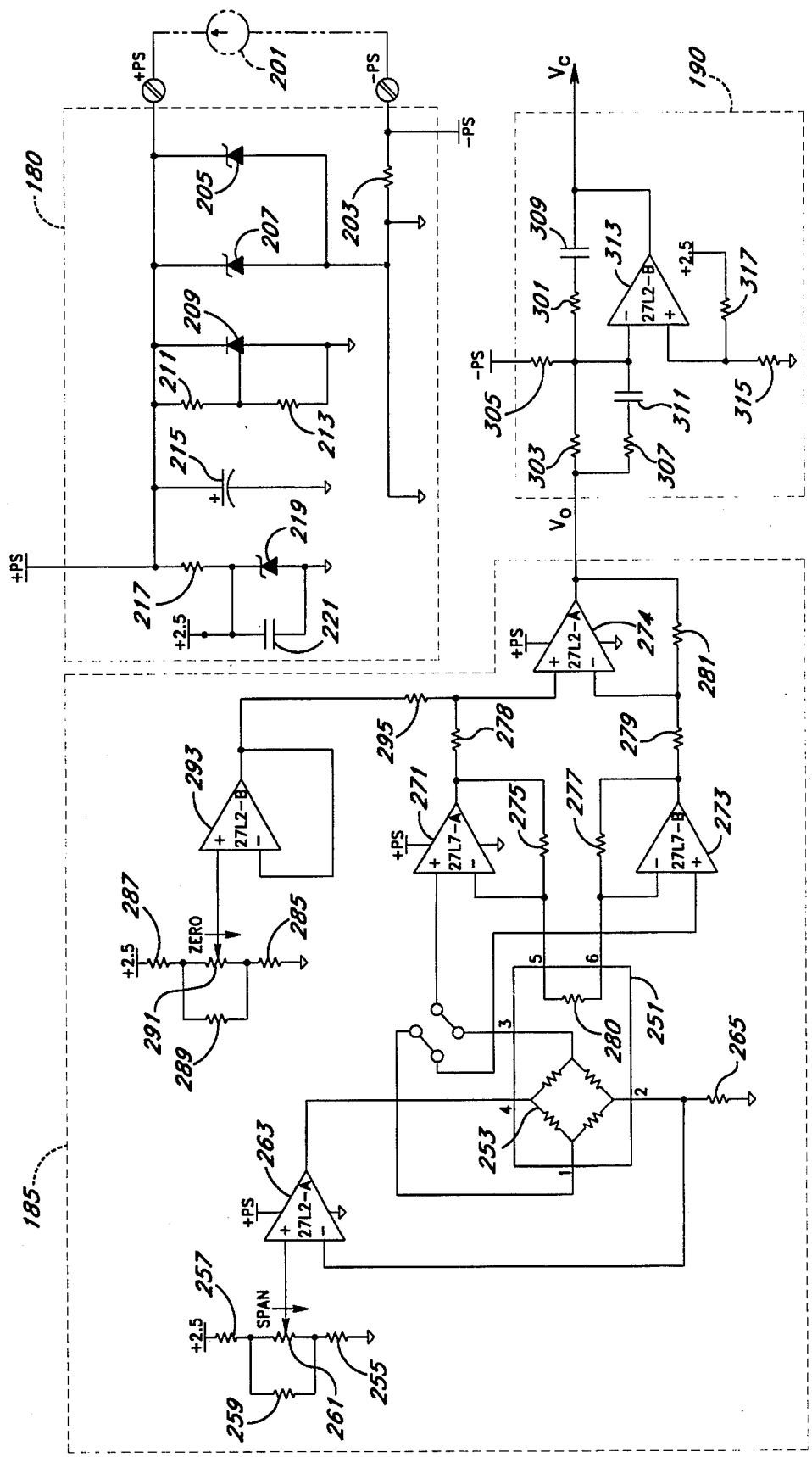
FIG. 10 is an electrical schematic of the control circuit of FIG. 6.

FIG. 10 is a more detailed schematic drawing of a control circuit having features of the present invention. The circuit generally comprises a power supply portion 180, a pressure sensing portion 185 and a PID feedback portion 190, as shown.

The circuit is powered by a variable current source 201, shown here in phantom for illustrative purposes only, coupled between power supply terminals +PS and −PS, as shown. The output of the current source 201 is preferably a current signal that can be selectively varied, as desired, between a range of about 4 to 20 mA. It will be appreciated by those skilled in the art that variable 4:20 mA current sources are readily available through a variety of commercial sources, such as from Honeywell, Model No. 3000 DCS. The current signal output of the current source 201 preferably corresponds to a desired output pressure response $P_o$ of the pneumatic control system.

A resistor 203 is further provided in series with the current source 201, as shown. It will be appreciated that for a given current delivered by the current source 201, a corresponding voltage −PS will be dropped across the resistor 203, relative to common. This control voltage −PS corresponds to the input command voltage $-V_d$ described above in connection with FIGS. 5–7. A pair of Zener diodes 205 and 207 are provided in shunt with the current source 201, as shown, to regulate peak supply voltage and to prevent overload of the circuit by excessive voltages +PS with respect to common. Two parallel coupled Zener diodes 205 and 207 are preferred for redundancy purposes in order to meet minimum intrinsic safety standards such as outlined in Elcon Instruments, Inc., *Introduction to Intrinsic Safety*, Chapter 4 (1989). Alternatively, a single Zener diode or other device may be used as desired, while still enjoying the benefits of the present invention.

The positive supply rail +PS is further regulated by a variable voltage regulator 209. The voltage regulator 209 is preferably of a commonly available type, such as a TI-TL431 Adjustable Precision Shunt Regulator, available from Texas Instruments. Typically, such devices have a control terminal adapted to be coupled between a pair of series coupled resistors 211 and 213, as shown, forming a voltage divider between the supply rail +PS and common. The output of the voltage regulator may be varied, as desired, by selecting the relative values of resistors 211 and 213. A regulated supply rail voltage +PS of approximately 4.3 volts is preferred, although higher or lower regulated voltages may be used, as desired, depending upon the sensitivity and power requirements of other circuit elements comprising the circuit. Capacitor 215 is a filter capacitor for stabilizing the power supply rail +PS and for filtering out any unwanted electromagnetic interference (EMF). Preferably, this comprises a relatively large capacitor, such as a 10 µF 25-volt electrolytic DC capacitor, as shown.

An auxiliary regulated voltage supply is also preferably provided by a voltage dropping network consisting of resistor 217 coupled in series with a Zener-type voltage reference diode 219. A filter capacitor 221 is coupled across the reference diode 219 to help stabilize the voltage output thereof. Preferably, the reference diode 219 is a 2.5 volt two-terminal band-gap voltage reference diode, such as National Semiconductor No. LM385-2.5 Micropower Voltage Reference Diode, available from National Semiconductor Corp. Alternatively, a higher or lower voltage reference diode 219 may be used to provide corresponding higher or lower auxiliary regulated voltage outputs, as desired.

The pressure sensing circuit 185 receives all of its power from the +PS supply rail, as shown. The heart of the pressure sensing circuit 185 is an electrical pressure transducer 251. The pressure transducer 251 is preferably a strain gauge transducer of the type formed integrally on a single microchip. A strain gauge-type transducer with built in gain programming, such as Model No. TN-003, available from IC Sensors of Milpitas, Calif., provides a convenient pressure transducer 251 useful for most purposes. This particular pressure transducer 251 is available in a six-pin package and includes a strain gauge 253 arranged in a Wheatstone bridge configuration, as shown.

It will be understood that the strain gauge 253 is mounted on a flexible diaphragm (not shown) or other flexible substrate, as desired. One side of the flexible diaphragm is exposed to the pressure to be measured, which corresponds to $P_o$ shown in FIGS. 4–7. The other side of the flexible diaphragm is exposed to a convenient reference pressure, such as atmospheric. The Wheatstone bridge 253 is excited by a constant current provided through pins 4 and 2, as shown, such that the potential across pins 1 and 3 will vary according to the difference in the ratio of resistance on opposite legs of the Wheatstone bridge. This, in turn, will vary as the measured pressure $P_o$ increases or decreases.

The sensitivity or gain $k_s$ of the pressure transducer may be varied, as desired, by increasing or decreasing the magnitude of the excitation current applied through terminals 4 and 2. A variable voltage divider is provided for this purpose comprising resistors 255, 257, 259, potentiometer 261, and operational amplifier 263. Resistors 255, 257 and the potentiometer 261 are coupled in series, as shown, between +2.5 volts and common, forming a voltage divider. An optional resistor 259 is further provided in shunt across the potentiometer element, as desired, in order to provide a stable voltage drop across the potentiometer 261 such that it is substantially unaffected by changes in the resistance of the potentiometer element caused by temperature drift.

The non-inverting input terminal of the operational amplifier 263 is coupled to the wiper of the potentiometer 261, as shown. The output terminal of the operational amplifier 263 is applied to one end of the strain gauge element 253. The inverting terminal of the operational amplifier 263 is coupled between the other end of the strain gauge 253 and a resistor 265, which forms a voltage divider. Those skilled in the art will appreciate that the output of the operational amplifier 263 will be a constant current that is proportional to the voltage on the wiper of the potentiometer 261 multiplied by an amplification or gain factor as determined by the ratio of the resistance of the strain gauge element 253 and resistor 265.

The output of the pressure transducer 251 is further provided to a signal conditioning circuit, as is well known in the art. See, e.g., *IC Sensors Application Note TN*-003, dated April 1988. In a preferred configuration, two-stage amplification of the output signal is provided by op-amps 271, 273 and 274, coupled together as shown. In the first stage pin 3 of the pressure transducer 251 is coupled to the non-inverting input terminal of operational amplifier 271. Pin 1 of the pressure transducer 251 is coupled to the non-inverting terminal of the operational amplifier 273. Each of the op-amps 271 and 273 is further configured to provide negative feedback through corresponding resistors 275 and 277, respectively, as shown. A further resistor 280 internal to the pressure transducer 251 is provided between the inverting input terminals of the op-amps 271 and 273 such that the conditioning circuit forms a differential amplifier having a span and gain determined by resistors 275, 277 and 280. See *IC Sensors Application Note TN*-003, page 1.

Second stage amplification is achieved through op-amp 274, which receives the differential floating voltage from the first stage amplification, comprising op-amps 271 and 273, and transforms it into a single ended output voltage signal ($V_o$) corresponding to the observed pressure $P_o$. The non-inverting terminal of the second-stage op-amp 274 is coupled to the output terminal of the first-stage op-amp 271 through resistor 278, as shown. The inverting terminal of the second-stage op-amp 274 is coupled to the output terminal of the first-stage op-amp 273 through resistor 279, as shown. Negative feedback is further provided from the output of the second-stage op-amp 274 to the inverting terminal thereof through resistor 281. It will be understood by those skilled in the art that the output of the second stage op-amp 274 will be proportional to the differential output of op-amps 271 and 273 multiplied by a selected gain factor determined by the ratio of resistors 279 and 281.

An optional adjustment circuit is further provided for adjusting the zero-offset of the output voltage signal $V_o$. The adjustment circuit comprises a voltage divider formed of resistors 285, 287, 289, potentiometer 291 and op-amp 293, as shown. The wiper of the potentiometer 289 is coupled to the non-inverting terminal of the op-amp 293 with unity feedback being provided to the inverting terminal thereof. The output of the op-amp 293 is provided to a resistor network consisting of resistors 295 and 278, as shown, such that the voltage applied to the non-inverting terminal of the second-stage op-amp 274 is increased or decreased, accordingly, by a predetermined offset, as desired.

The PID feedback portion 190 of the control circuit is substantially the same as illustrated and discussed above in connection with FIG. 6 with a few exceptions set forth below. It may be seen, for instance, that resistors 301, 303 and 305 correspond to resistors $R_1$, $R_2$, and $R_3$ in FIG. 6, respectively. Capacitors 309 and 311 correspond to capacitors $C_1$ and $C_2$, respectively. Op-amp 313 corresponds to op-amp A. As illustrated in FIG. 10, resistor 307 is optionally provided in series with capacitor 311 to avoid overloading the op-amp 313 in response to a step-wise increase or decrease in the input signal −PS. Resistors 315 and 317 form a voltage divider, as shown, to pull up the non-inverting terminal of the op-amp 313 to a reference voltage between 0 and 2.5 volts. Alternatively, any convenient reference voltage may be used, as desired while still enjoying the benefits of the present invention as herein disclosed.

Figure 11:
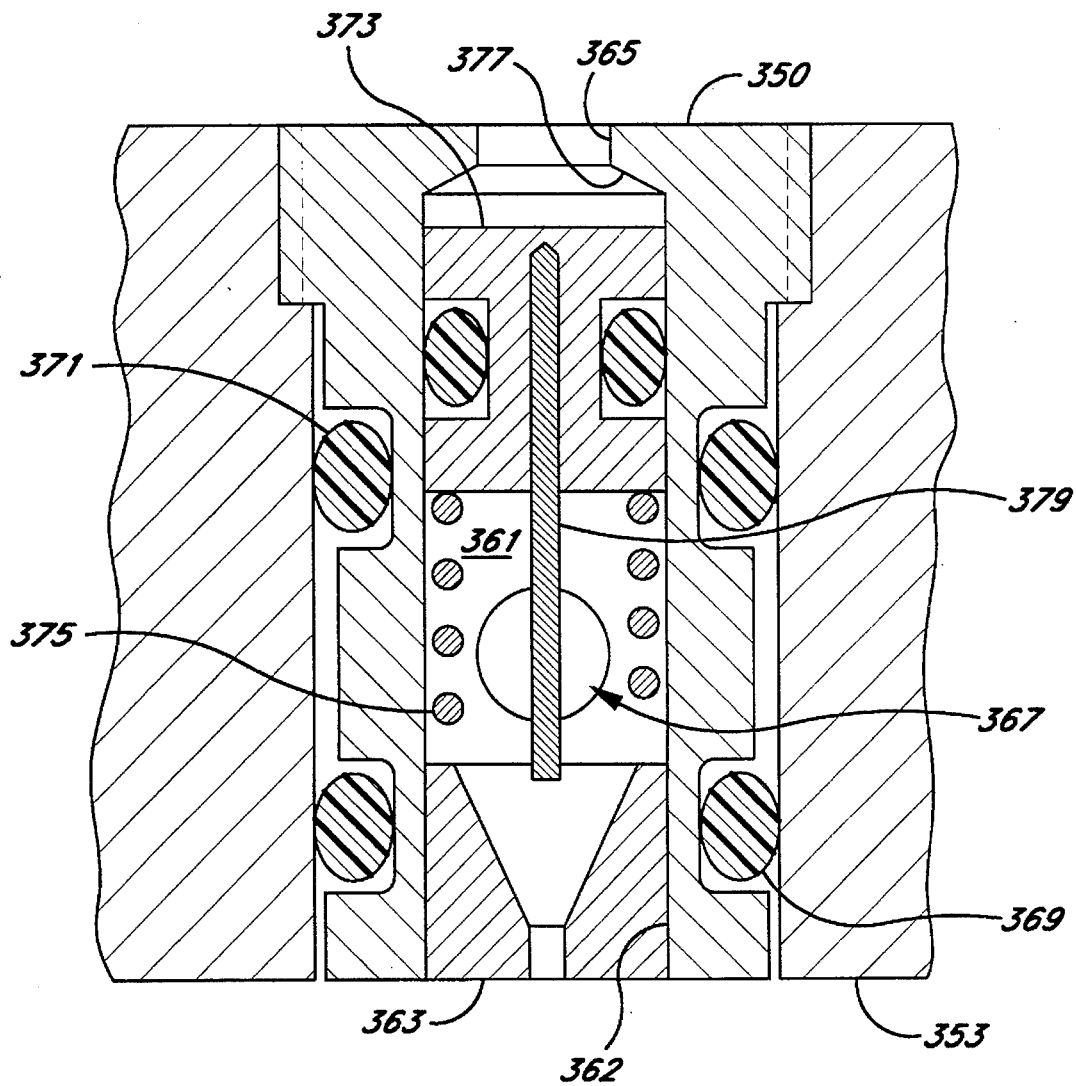
FIG. 11 is a cross-sectional view of a plunger activated orifice clean-out device having features of the present invention.

FIG. 11 illustrates one possible embodiment of an orifice clean-out device having features of the present invention. The clean-out device includes a cylindrical housing 350 adapted to be fitted within an opening provided in the wall of a pneumatic device 353, shown here in partial break-away cross-section. Those skilled in the art will appreciate that the pneumatic device 353 may be any variety of pneumatic devices which utilize flow orifices, such as a pneumatic circuit, a booster or a pneumatic valve.

The housing 350 has an inner cavity 361 extending axially through the housing 350. At one end of the housing the cavity 361 defines an opening 362 for receiving an insertable orifice 363. This may be of the type discussed above in connection with FIG. 4 or, alternatively, it may be any variety of insertable flow orifices which are commonly available in the industry. At the other end of the housing 350 the cavity 361 defines an access hole 365 through which an elongated actuator member may be inserted, as will be described later.

A passage 367 is further provided in the housing 365 for allowing pneumatic fluid to pass from the pneumatic device into said inner cavity 361 and through the orifice 363. The housing 350 is pneumatically sealed within the opening in the pneumatic device 353 by a pair of O-rings 369 and 371 mounted on either side of the passage 367. Those skilled in the art will appreciate that these rubber O-rings 369 and 371 prevent pneumatic fluid from flowing around the housing 350 and escaping from the pneumatic device 353.

A plunger 373 is mounted within the inner cavity 361 of the housing 350. The plunger 373 is configured so as to allow it to slide axially within the inner cavity 361. Preferably, the plunger 373 is sealed within the cavity 361 so as to prevent the escape of pneumatic fluid around the plunger 373. A compression spring 375 is further disposed within the cavity 361 for acting upon the plunger 373 and urging it toward the access hole 365. The access hole is preferably of a smaller diameter than the inner cavity 361 so that a shoulder 377 is formed for retaining the plunger 373 within the cavity 361. Those skilled in the art will appreciate that the plunger is resiliently displacable by way of an elongated actuator member (not shown) acting through the access hole 365. This may be the tip of a pencil or some other convenient implement, for instance, inserted through the access hole 365. Alternatively, an elongated actuator member may be provided extending from the plunger 373 through the access hole 365 such that the plunger may be finger actuated.

A pin 379 extends axially from the plunger 373, as shown. The pin 379 is substantially aligned with the orifice 363 and is of sufficient length such that the pin 379 enters and passes through the orifice 363 when the plunger 373 is fully actuated. Those skilled in the art will appreciate that this will have the effect of clearing the orifice 363 of any obstructions or debris which may partially or fully clog the orifice. Preferably, the pin 379 is formed of a section of wire, such as music wire, having an outer diameter that is at least slightly smaller than the inner diameter of the orifice 363.

Although this invention has been disclosed in the context of certain preferred embodiments, it will be understood by those skilled in the art that the present invention extends beyond the specifically disclosed embodiments to other alternative embodiments of the invention. Thus, it is intended that the scope of the present invention herein disclosed should not be limited by the particular disclosed embodiments described above, but should be determined only by reference to the claims that follow.

What is claimed is:

1. An electronic PID control circuit for providing fast and accurate closed-loop control of a load, said PID control circuit comprising:

a command input terminal for receiving a command voltage signal $(-V_d)$ corresponding to a desired output response provided to said load;

a first electrical impedance coupled between said command input terminal and a current summation junction, said first electrical impedance delivering to said current summation junction a first current that is substantially proportional to said command voltage signal;

a feedback input terminal for receiving a feedback voltage signal $(V_o)$ corresponding to the actual observed output response provided to said load;

a second electrical impedance coupled between said feedback input terminal and said current summation junction, said second electrical impedance delivering to said current summation junction a second current having at least one component thereof that is substantially proportional to said feedback voltage signal and at least another component that is substantially proportional to the derivative of said feedback voltage signal;

an integrating circuit responsive to said current delivered to said current summation junction for integrating the net current delivered to said current summation junction; and a control output terminal coupled to said integrating circuit for providing an electrical control voltage signal output $(V_c)$ in accordance with a predetermined transfer function of said control circuit, said transfer function being characterized by at least a second order system having proportional, integral and derivative components.

2. The PID control circuit of claim 1 wherein said first electrical impedance comprises a resistor having a resistance of between about 100 kΩ and 400 kΩ.

3. The PID control circuit of claim 1 wherein said second electrical impedance comprises a resistor and capacitor coupled in parallel, said resistor having a resistance of between about 100 kΩ and 400 kΩ and said capacitor having a capacitance of between about 0.040 μF 0.080 μF.

4. The PID control circuit of claim 1 wherein said integrating circuit comprises an inverting op-amp, the inverting input terminal thereof being coupled to said current summation junction and the output terminal thereof also being coupled to said current summation junction through a series coupled resistor and capacitor.

5. The PID control circuit of claim 4 wherein said resistor has a resistance of between about 1 MΩ and 10 MΩ and said capacitor has a capacitance of between about 0.040 μF 0.080 μF.

6. An electronic PID control circuit for providing fast and accurate closed-loop control of a load, said PID control circuit comprising:

a command input terminal for receiving a command signal input $(V_d)$ corresponding to a desired output response provided to said load;

a feedback input terminal for receiving a feedback signal $(V_o)$ corresponding to the actual observed output response provided to said load;

a control output terminal adapted to produce in response to said command signal input and said feedback signal a control signal output $(V_c)$ for controlling said load, said control signal output being generated substantially in accordance with a predetermined transfer function of said control circuit, said transfer function having the form:

$$V_c/V_o = -\left[\left(\frac{R_1}{R_2} + \frac{C_2}{C_1}\right) + \left(\frac{1}{R_2C_1}\right)\frac{1}{S} + (R_1C_2)S\right]$$

where $R_1$, $R_2$, $R_3$, $C_1$ and $C_2$ represent component values of individual electrical elements comprising said PID control circuit.

7. The PID control circuit of claim 6 wherein said control output terminal comprises the output terminal of an inverting op-amp.

8. The PID control circuit of claim 7 wherein a first resistor ($R_1$) and a fist capacitor ($C_1$) are further provided in series between the inverting input terminal of said op-amp and the output terminal of said op-amp.

9. The PID control circuit of claim 8 wherein a second resistor ($R_2$) and a second capacitor ($C_2$) are further provided in parallel between said feedback input terminal and said inverting input terminal of said op-amp.

10. The PID control circuit of claim 9 wherein a third resistor ($R_3$) is further provided between said command input terminal and said inverting input terminal of said op-amp.

11. The PID control circuit of claim 9 wherein said first resistor has a resistance of between about 1 MΩ and 10 MΩ, said second and third resistors have a resistance of between about 100 kΩ and 400 kΩ, and said first and second capacitors have a capacitance of between about 0.040 µF 0.080 µF.

12. A single op-amp PID control circuit having inherent integrator anti-windup compensation, said PID control circuit comprising:

a single inverting op-amp having at least one input terminal and at least one output terminal;

a first electrical impedance coupled between a command input terminal of said PID control circuit and said input terminal of said op-amp and being adapted to deliver to said input terminal of said op-amp a first current that is substantially proportional to a command voltage signal provided to said command input terminal;

a second electrical impedance coupled between a feedback input terminal of said PID control circuit and said input terminal of said op-amp and being adapted to deliver to said input terminal of said op-amp a second current having at least one component thereof that is substantially proportional to a feedback voltage signal provided to said feedback input terminal and at least another component that is substantially proportional to the derivative of said feedback voltage signal; and a third electrical impedance coupled between the output terminal of said op-amp and said input terminal of said op-amp and being adapted to deliver to said input terminal of said op-amp a current that is equal and opposite to the sum of the current delivered to said input terminal of said op-amp by said first and said second impedances, said third impedance further comprising an integrating storage element adapted to produce a control voltage signal output on a control output terminal of said PID control circuit that is substantially proportional to the integral of said current delivered to said input terminal of said op-amp by said third electrical impedance.

13. The PID control circuit of claim 12 wherein said first electrical impedance comprises a resistor having a resistance of between about 100 kΩ and 400 kΩ.

14. The PID control circuit of claim 12 wherein said second electrical impedance comprises a resistor and a capacitor coupled in parallel, said resistor having a resistance of between about 100 kΩ and 400 kΩ and said capacitor having a capacitance of between about 0.040 µF 0.080 µF.

15. The PID control circuit of claim 12 wherein said third electrical impedance comprises a resistor and a capacitor coupled in series, said resistor having a resistance of between about 1 MΩ and 10 MΩ and said capacitor having a capacitance of between about 0.040 µF and 0.080 µF.

\* \* \* \* \*